US009247691B2

(12) United States Patent
Andros et al.

(10) Patent No.: US 9,247,691 B2
(45) Date of Patent: Feb. 2, 2016

(54) DEVICE FOR PRUNING PLANT GROWTH

(75) Inventors: Matthew James Andros, Santa Margarita, CA (US); Garett John Stapp, San Luis Obispo, CA (US)

(73) Assignee: Sunview Vineyards of California, Delano, CA (US)

(*) Notice: Subject to any disclaimer, the term of this patent is extended or adjusted under 35 U.S.C. 154(b) by 0 days.

(21) Appl. No.: 13/535,329

(22) Filed: Jun. 27, 2012

(65) Prior Publication Data

US 2014/0000232 A1 Jan. 2, 2014

(51) Int. Cl.
*A01D 34/52* (2006.01)
*A01D 34/73* (2006.01)
*A01G 3/04* (2006.01)

(52) U.S. Cl.
CPC .................... *A01G 3/0408* (2013.01)

(58) Field of Classification Search
CPC ............ A01G 3/04; A01G 17/02; A01G 2003/04434; A01G 17/023; A01G 3/0408; A01D 34/866; A01D 46/28; A01D 34/863
USPC .......... 56/235, 233, 234, 236, 330; 47/1.01 R, 47/4
See application file for complete search history.

(56) References Cited

U.S. PATENT DOCUMENTS

| | | | | |
|---|---|---|---|---|
| 53,033 A * | 3/1866 | Oliver | | 56/235 |
| 2,926,480 A * | 3/1960 | Kimball | | 56/235 |
| 3,246,460 A * | 4/1966 | Patterson et al. | | 56/235 |
| 3,760,574 A * | 9/1973 | Tassone | | 56/330 |
| 3,952,485 A * | 4/1976 | McRobert | | 56/235 |
| 4,383,400 A * | 5/1983 | Mead et al. | | 56/233 |
| 4,543,775 A * | 10/1985 | Horn et al. | | 56/235 |
| 4,733,525 A * | 3/1988 | Pellenc et al. | | 56/503 |
| 5,544,444 A * | 8/1996 | Oldridge | | 47/4 |
| 5,694,753 A * | 12/1997 | Dellinger | | 56/234 |
| 5,737,908 A * | 4/1998 | Andelfinger | | 56/235 |
| 5,791,129 A * | 8/1998 | Pellenc | | 56/15.1 |
| 6,250,056 B1 * | 6/2001 | Spagnolo | | 56/235 |
| 6,286,605 B1 * | 9/2001 | Landeis | | 171/50 |
| 6,374,538 B1 * | 4/2002 | Morris et al. | | 47/58.1 FV |
| 6,523,337 B2 * | 2/2003 | Spagnolo | | 56/234 |
| 6,634,162 B1 * | 10/2003 | Andros | | 56/328.1 |
| 6,860,093 B2 * | 3/2005 | Scordilis | | 56/15.2 |
| 6,959,528 B1 * | 11/2005 | Scordilis | | 56/15.8 |
| 7,652,766 B2 * | 1/2010 | Pellenc | | 356/432 |
| 7,870,712 B2 * | 1/2011 | Pellenc | | 56/234 |
| 8,230,671 B2 * | 7/2012 | Pellenc et al. | | 56/235 |
| 2002/0043061 A1 * | 4/2002 | Spagnolo | | 56/229 |
| 2006/0162309 A1 * | 7/2006 | Schloesser | | 56/255 |

(Continued)

FOREIGN PATENT DOCUMENTS

| | | | | | |
|---|---|---|---|---|---|
| EP | 312126 A | * | 4/1989 | | A01G 3/04 |
| EP | 1541009 A1 | * | 6/2005 | | A01G 3/04 |

(Continued)

*Primary Examiner* — Árpád Fábián-Kovács
(74) *Attorney, Agent, or Firm* — R. Scott Kimsey, Esq.; Klein DeNatale Goldner

(57) ABSTRACT

A device for pruning plant material includes a frame, a vertical arm extending from the frame, and an angled pruning head extending from the vertical arm. The angled pruning head includes at least one cutting disk attached to a first shaft, and an anvil assembly having at least one anvil pair attached to a second shaft. The first and second shafts are substantially parallel to one another. The at least one cutting disk is aligned to be selectively positionable between the anvils of the at least one anvil pair.

14 Claims, 14 Drawing Sheets

(56) References Cited

U.S. PATENT DOCUMENTS

| | | | |
|---|---|---|---|
| 2006/0272201 A1* | 12/2006 | Pellenc | 47/1.01 R |
| 2009/0090093 A1* | 4/2009 | Pellenc | 56/10.2 E |
| 2010/0281770 A1* | 11/2010 | George et al. | 47/1.43 |
| 2012/0073257 A1* | 3/2012 | Pellenc et al. | 56/235 |
| 2013/0199089 A1* | 8/2013 | George et al. | 47/1.43 |
| 2014/0000232 A1* | 1/2014 | Andros et al. | 56/235 |

FOREIGN PATENT DOCUMENTS

| | | | | |
|---|---|---|---|---|
| FR | 2881611 A1 * | 8/2006 | | A01G 3/04 |
| FR | 2917944 A1 * | 1/2009 | | A01G 3/04 |
| WO | WO2012023115 A2 * | 2/2012 | | B44B 3/02 |

* cited by examiner

DEVICE FOR PRUNING PLANT GROWTH

RELATED APPLICATIONS

Not Applicable.

BACKGROUND OF THE INVENTION

1. Field of the Invention

The present invention relates generally to an agricultural device for pruning plant growth, and specifically to a device for pruning grapes.

2. Background

Grapes have been grown by mankind for thousands of years, producing fresh fruit as well as preservable products such as raisins, wine and distilled spirits. Early vineyardists discovered that by removing a measured amount of seasonal growth during dormancy, a more predictable quantity of fruit would be produced during the following growing season. These pruned vines consistently bore more fruit, of higher quality, than vines that did not have this seasonal growth removed.

Pruning practices specific to vines producing fruit for the fresh market, (such as table grapes), are especially important because they allow growers to maintain the critical balance between foliar growth and fruit growth required to produce grapes of consistent yield and quality.

Traditionally, pruning is performed by hand crews working in the vines during the winter dormant season (December-February). Hand-pruning of smaller vineyards is still a common practice, but many modern vineyards have grown very large requiring many pruning crews to complete the process during the optimal pruning window. The high cost and uncertain supply of people to do this work has forced viticulturalists to seek more cost effective and reliable means of pruning their vines.

One proven method that reduces pruning time, lowers overall cost and increases field capacity, is a two-step process that utilizes a combination of powered machinery and hand labor. A typical system will include a mechanical pruner mounted on, and powered by, a field tractor that will carry it over or alongside the vine row. The device will employ some type of cutter(s) that can remove a portion of the seasonal growth (sometimes in excess of ninety percent). This rough pruning is the first step of the process and can typically remove a large portion of the seasonal growth. This allows the second step of the operation, hand pruning the vine to the desired shape and bud count. Because the pruning process removes the majority of canes, hand crews move through the field much more rapidly than in situations where no pruning has taken place. This "mechanically assisted" hand pruning is safer and less fatiguing to workers since hand crews are no longer required to pull canes through the trellis wires as they work their way through the field. This two step process requires fewer people and less time than employing a hand crew to prune all the seasonal growth down to the final finishing cut.

To date, attempts to produce machines for pruning vines trained to produce table grapes have not met with success. This lack of success has much to do with how table grapevines are trained. Most pruning machines are designed to work on vines that have been pruned and trained in a way that forces seasonal growth upwards within a vertical plane directly above the vine arms (cordons). With the trunk of the vine supported by a stake and with a multitude of wires running the full length of the vinerow, above and on either side of the cordons, seasonal growth is constrained within a vertical plane growing upwards from the vine's arms. Having the canes (the vine's seasonal growth) oriented in this manner allows the cutter blades of a pruner to pass through these vertically oriented canes and cut them. By using several blades aligned on a common shaft making simultaneous cuts along the length of the canes, long canes are reduced to small cane sections that fall away and through the training wires, leaving shorter canes protruding from the cordons that are later finish pruned by hand.

Table grapes present additional challenges in terms of pruning. Due to the table grape's unique growing requirements, its seasonal growth may be oriented horizontally, reaching upwards and outward, supported by horizontal arms and trellising wire. Creating this horizontal canopy of leaves maximizes the photosynthesis capacity of the vine and provides a shaded environment for the fruit growing beneath the canopy.

To mechanically prune vines trained using the horizontal training system employed with table grapes, a pruning machine should have the ability to 1) position the cane cutting portions of the machine along a horizontal plane, enabling them to cross-cut the canes laying on the trellis wires; 2) cut canes while allowing the trellis wires and their associated support arms to pass through the cutting devices without being damaged; and 3) allow the operator to effectively control cut location, machine height, and alignment down the vine row.

Many existing pruning devices use a cutting system that relies on multiple rotating and/or non-rotating blades to sever the canes at multiple locations to reduce the quantity of seasonal growth. Some such devices utilize saw blades rotating at high speed and protective disks that rotate at the tractor's ground speed, creating a non-moving (relative to the canes being cut) series of guides that hold and feed the canes through the rotating blades. Other devices use non-moving blades aligned vertically. Between each set of blades is a rotating disk with protruding fingers that push the vertical canes through the blades, severing the canes.

What is needed is a device for pruning table grapes that has the ability to pre-prune horizontally trained vines, has no high-speed components such as circular saw blades, and has reduced maintenance and parts costs.

SUMMARY OF THE INVENTION

The present invention provides a device for pruning plant material includes a frame, a vertical arm extending from the frame, and an angled pruning head extending from the vertical arm. The angled pruning head includes at least one cutting disk attached to a first shaft, and an anvil assembly having at least one anvil pair attached to a second shaft. The first and second shafts are substantially parallel to one another. At least one cutting disk is aligned to be selectively positionable between the anvils of the at least one anvil pair.

In another aspect of the present invention, a hydraulic cylinder is operable to raise and lower the height of the vertical arm extending from the frame.

In another aspect of the present invention, the first shaft includes a opening wheel having a diameter greater than that of the at least one cutting disk.

In another aspect of the present invention, each of the anvils of the anvil assembly has a serrated edge.

In another aspect of the present invention, the frame includes at least one wheel mounted on a lower portion of the frame. The wheel contacts the ground and allows the device to move thereover.

In another aspect of the present invention, the pruning head is adapted to rotate from about forty-five to about ninety degrees relative to the vertical arm.

In another aspect of the present invention, the frame is adapted to be attached to a vehicle for moving the present device along a row of grape vines.

In another aspect of the present invention, a first hydraulic cylinder is associated with the first shaft, and a second hydraulic cylinder is associated with the second shaft. The first and second hydraulic cylinders are operable to adjust the relative positions of the first and second shaft with respect to one another.

In still another aspect of the present invention, each of the two anvils of an anvil pair includes a plurality of serrations along an outer edge of the anvil. The serrations are sized and shaped to engage the plant growth to be pruned and to direct the plant growth to the cutting disks.

In another aspect of the present invention, the serrations are sized and shaped to engage a trellis cross-arm so that the cross-arm is pushed by the anvils in the direction of travel of the anvils, allowing the present device to safely pass the cross-arm.

In another aspect of the present invention, a sensor is provided for detecting the force against the anvils of the device. When the detected force exceeds a predetermined amount, the pruning head will open until the force exerted by the first and second hydraulic cylinders is within an acceptable range.

In another aspect of the present invention, the anvils include a circular rim and an axial hole extends through the center of each anvil. The serrations around the outer edge of the anvils include a rearward edge that extends away from the circular rim, an outward edge that extends away from the rearward edge, and a forward edge that extends away from the outward edge and to the circular rim.

In another aspect of the invention, the serrations on the anvil are shaped such that a line drawn along the outward edge is at about forty-five degrees to a line drawn along the rearward edge. A line drawn along the forward edge is at about one-hundred twenty degrees to a line drawn along the outward edge.

In another aspect of the invention, a line drawn along the rearward edge is at about fifteen degrees to a line drawn along the forward edge.

In another aspect of the invention the length of the forward edge is about 1.32 times the length of the outward edge.

In another aspect of the invention, the outward edge has a length of about 0.676 inches and the forward edge has a length of about 0.895 inches.

DETAILED DESCRIPTION OF THE INVENTION

Figure 1:
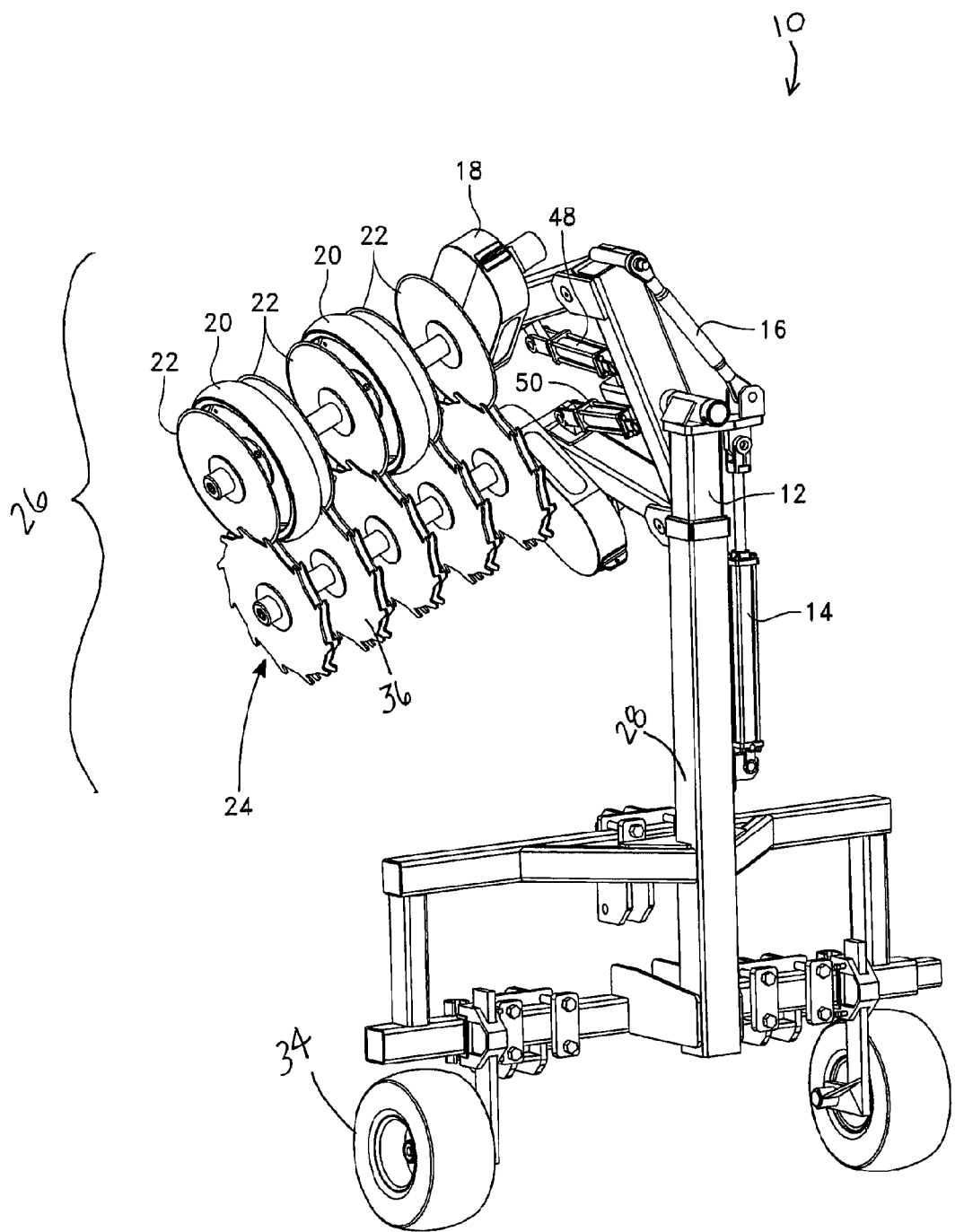
FIG. 1 is a front perspective view of one embodiment of a pruning device of the present invention, the pruning device adapted for mounting on a tractor or other vehicle.

Turning now to the drawings, wherein like numerals indicate like parts, FIG. 1 is a perspective view of one embodiment of a pruning device 10 of the present invention, the pruning device being adapted for mounting on a tractor or other vehicle. Pruning device 10 includes, generally, a vertical arm 12 extending from a frame 28, and an angled pruning head 26 extending from vertical arm 12. Angled pruning head 26 includes at least one cutting disk 22 and at least one anvil assembly 24, the anvil assembly being comprised of a pair of anvils 36.

Figure 7:
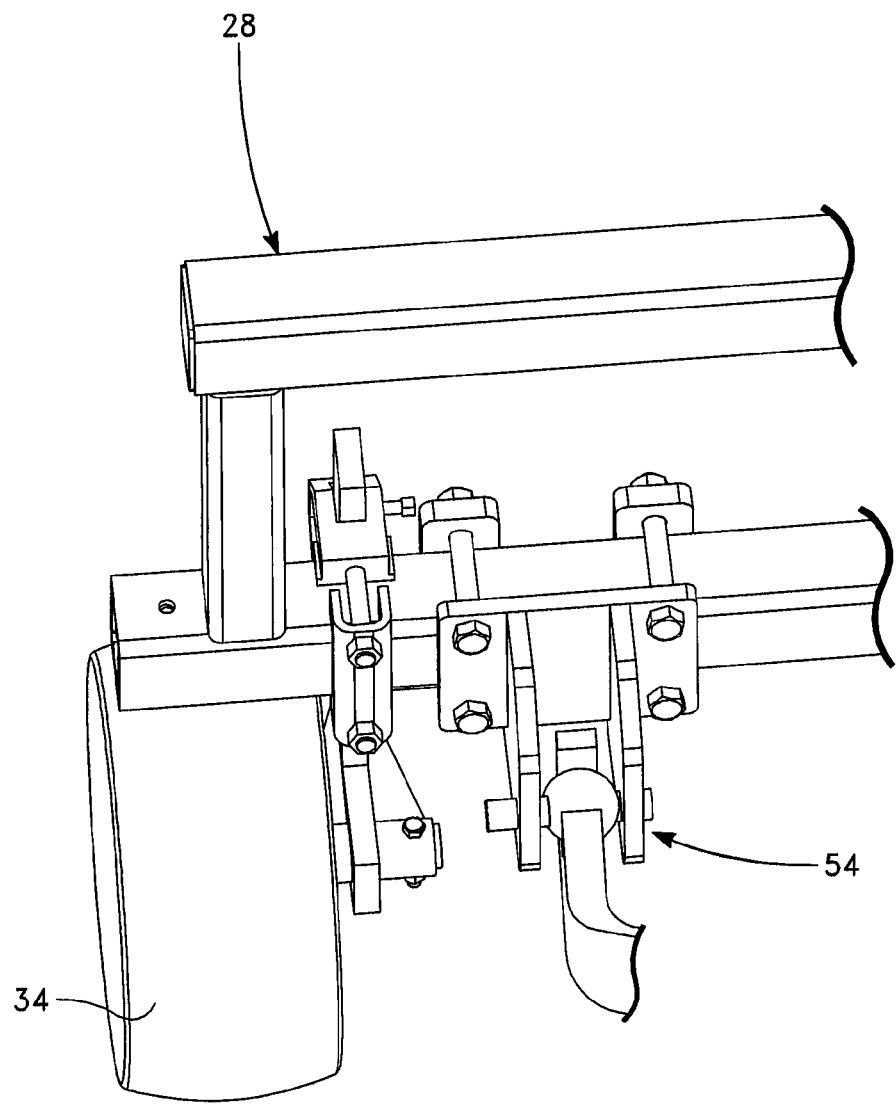
FIG. 7 is a rear perspective view of a portion of one embodiment of a frame of the present invention, the figure depicting a wheel associated with the frame, and also showing a fastening system for attaching the frame to a vehicle.

Frame 28 is a rigid frame on which the other components of pruning device 10 are supported. Frame 28 is preferably constructed of steel, but may be constructed of any suitable material. Frame 28 is preferably adapted to attach to a tractor or other vehicle (not shown) for moving pruning device 10 along a row of plants to be pruned. It is to be understood that any suitable vehicle may be used and may have pruning device 10 affixed thereto. Numerous suitable vehicles are known in the art, and attachment of pruning device 10 of the present invention to any such vehicle will be well within the capabilities of one of ordinary skill in the art upon reading this disclosure. Pruning device 10 of the present invention preferably includes at least one wheel 34 attached to frame 28 for allowing pruning device 10 to move along a row between plants. In some embodiments of the present invention, however, pruning device 10 may lack wheels and may be suspended from a tractor or other mobile device adapted to receive pruning device 10 attached thereto. FIG. 7 depicts the lower link of a three-point attachment system of a vehicle, such as, for example, a tractor.

Frame 28 includes a vertical arm 12 extending therefrom. Vertical arm 12 is preferably adapted to be raised or lowered with respect to frame 28, thereby allowing for alignment of the height of pruning head 26. As shown in the Figures, vertical arm 12 preferably moves in telescoping fashion, within an upwardly extending sleeve that is part of frame 28. A hydraulic cylinder 14 preferably controls the upward and downward movement of vertical arm 12, allowing an operator of pruning device 10 to adjust vertical arm 12 as necessary or desirable.

Figure 2:
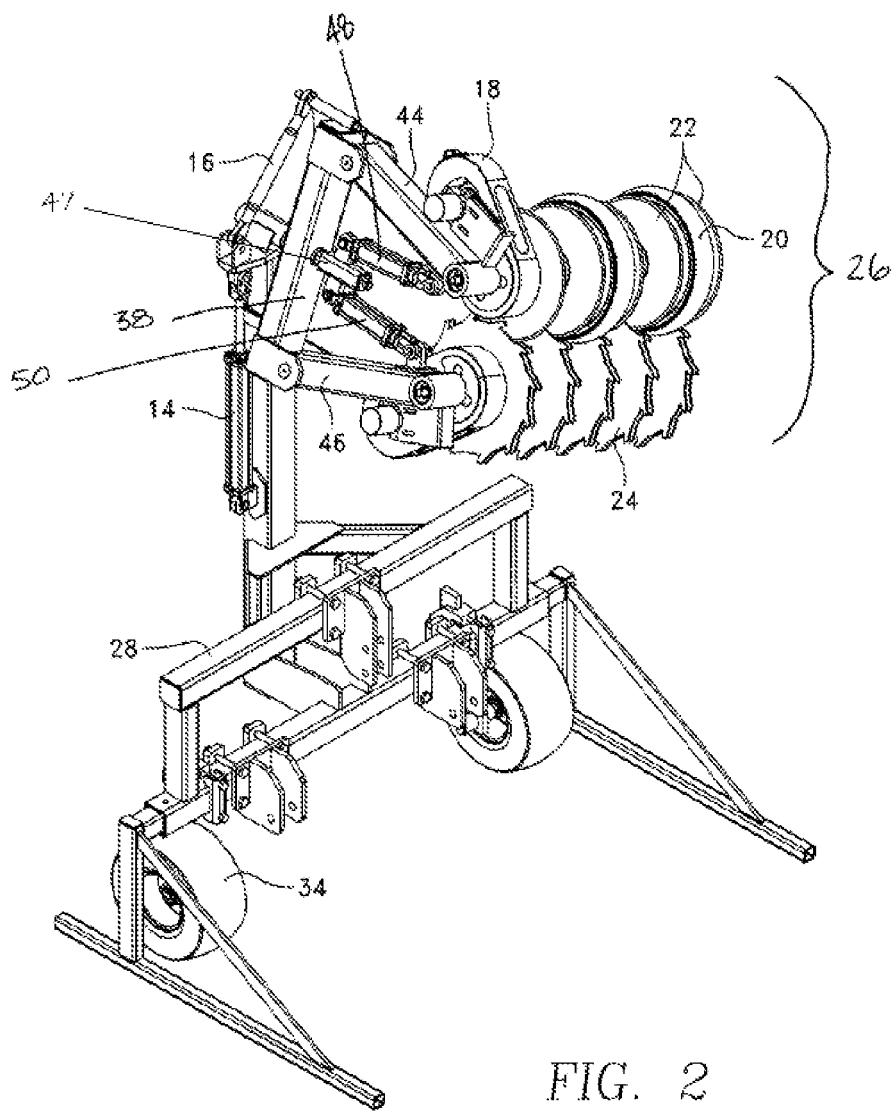
FIG. 2 is a rear, side perspective view of one embodiment of a pruning device of the present invention.

As best shown in FIG. 2, pruning head 26 preferably includes a structural arm 38 extending between a disk support arm 44 and an anvil support arm 46. Disk support arm 44 and anvil support arm 46 preferably extend away from structural arm 38 such that disk support arm 44 and anvil support arm 46 are angled toward one another, allowing for the cooperative action of the associated cutting disks and anvils. The angle at which the disk support arm 44 and anvil support arm 46 extend from structural arm 38 is manually adjustable by jack screw 47. Each of the disk support arm 44 and anvil support arm 46 includes a shaft associated therewith, the shaft having additional components of the pruning head 26 disposed thereon. A cutter shaft 40 extends from disk support arm 44, and an anvil shaft 42 extends from anvil support arm 46 (both best shown in FIG. 3). The cutter shaft 40 and the anvil shaft 42 are preferably disposed in parallel arrangement with respect to one another.

Figure 3:
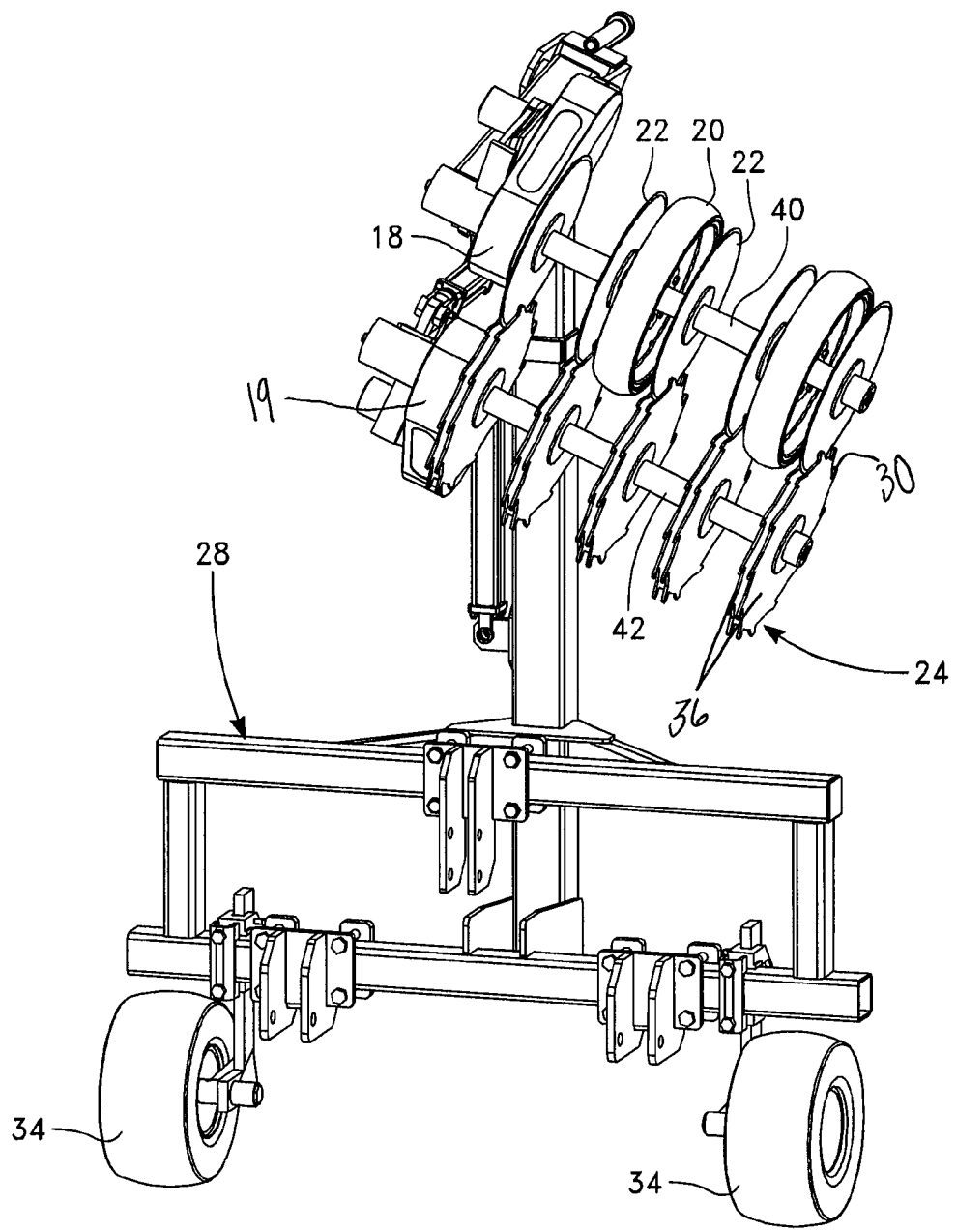
FIG. 3 is a rear perspective view of one embodiment of a pruning device of the present invention.

FIG. 3 provides a rear perspective view of one embodiment of a pruning device of the present invention. As can be seen in the Figure, a plurality of cutting disks 22 are disposed along cutter shaft 40, cutting disks 22 being attached to cutter shaft 40 such that rotation of cutter shaft 40 causes a corresponding rotation of cutting disks 22. At least one opening wheel 20 is also disposed along cutter shaft 40, though opening wheel 20 may rotate with the motion of cutter shaft 40 or may be free from the rotational movement of cutter shaft 40. The rotational movement of cutter shaft 40 may be provided in any suitable manner. In the embodiment of pruning device 10 shown in the drawings, cutter shaft 40 rotates due to the action of a motor and chain drive assembly (not shown) contained within housing 18.

Figure 4:
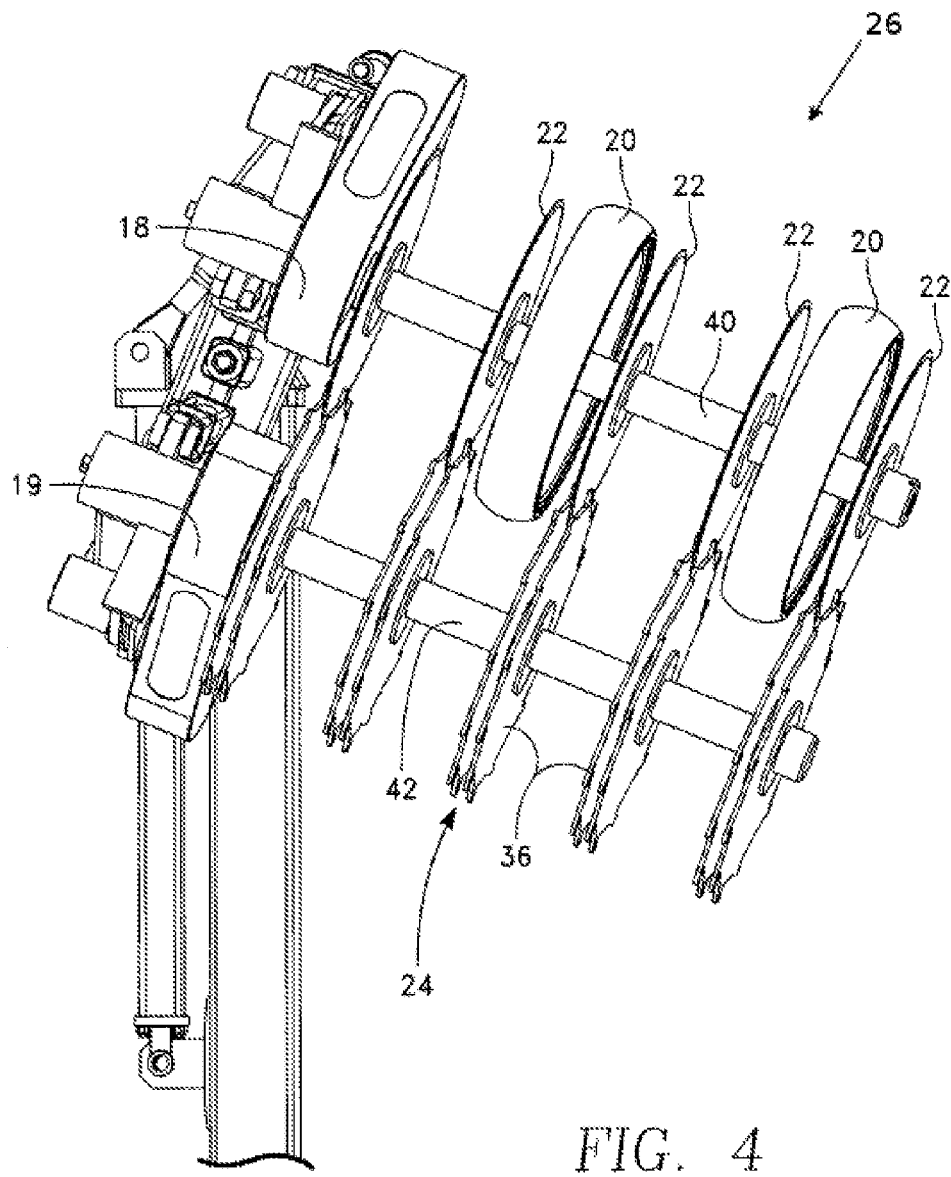
FIG. 4 is a close rear perspective view of one embodiment of a pruning head of the present invention.
Figure 5:
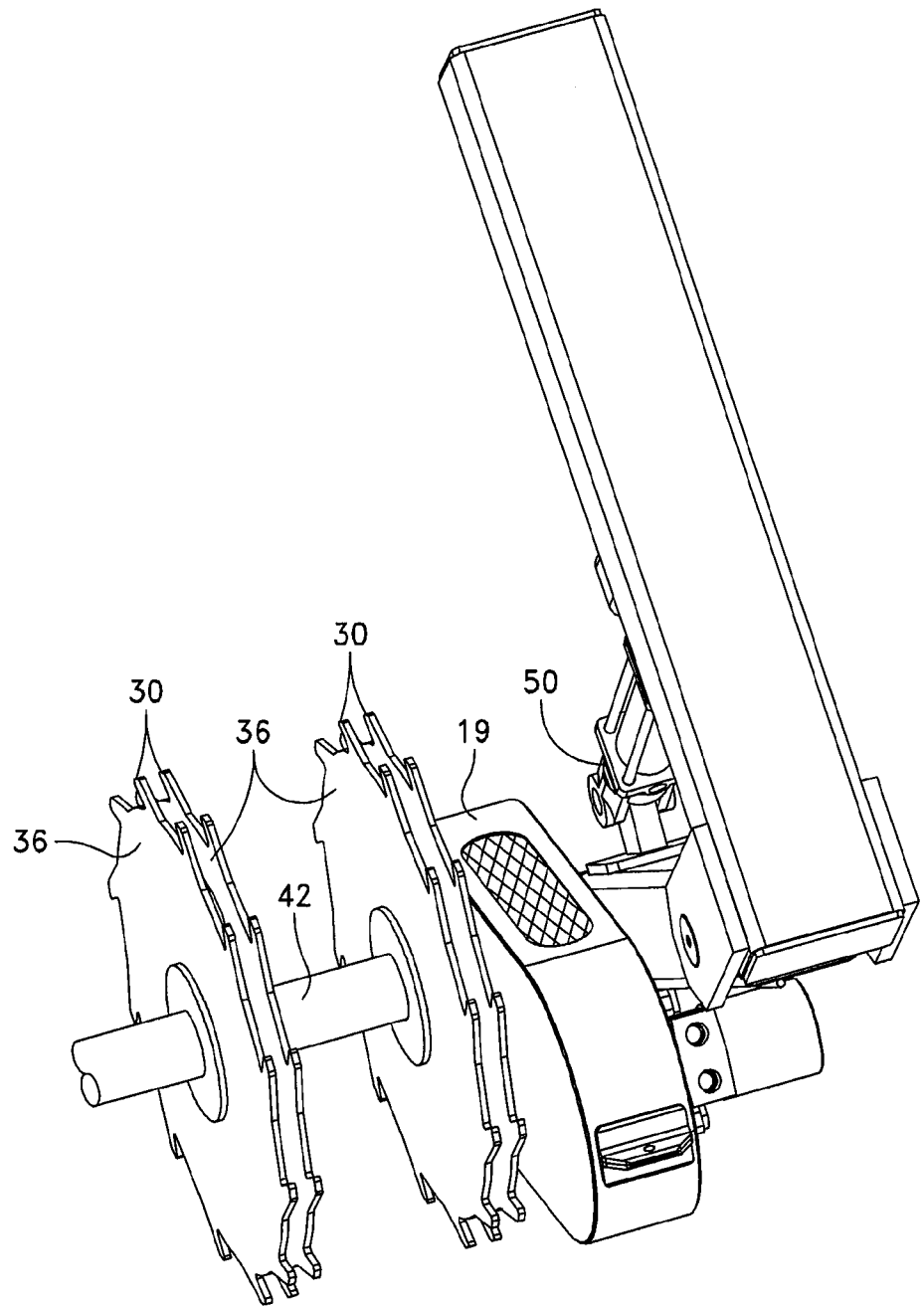
FIG. 5 is a perspective view of a portion of an anvil support arm of the present invention, the figure depicting an anvil assembly and pinch cylinder associated with the support arm.

As also shown in FIG. 3, anvil shaft 42 includes a plurality of anvil assemblies 24 disposed along a length thereof. Each anvil assembly 24 includes a pair of anvils 36 in close spatial arrangement. In the embodiment of pruning device 10 shown in the drawings, anvils 36 have serrated edges 30. Anvil assemblies 24 are disposed along a length of anvil shaft 42 such that rotation of anvil shaft 42 causes a corresponding rotation of each anvil assembly 24. The rotational movement of anvil shaft 42 may be provided in any suitable manner. In the embodiment of pruning device 10 shown in the drawings, anvil shaft 42 rotates due to the action of a motor and chain drive assembly (not shown) contained within housing 19. FIG. 4 provides a perspective view of pruning head 26, showing both the cutter shaft 40 and anvil shaft 42, as well as cutting disks 22, anvil assemblies 24, and motor housing 19. FIG. 5 provides a perspective view of housing 19 for a motor and chain drive assembly for rotating anvil shaft 42.

Pruning head 26 is preferably provided as an adjustable pruning head rotatably attached to vertical arm 12. This arrangement can be seen in FIG. 1. A turnbuckle 16, such as, for example, a manually-operated jack screw, is preferably provided for adjusting the angle of rotation of pruning head 26 with respect to vertical arm 12. The ability to raise and lower vertical arm 12, as well as to adjust the angle of pruning head 26, allows the present pruning device 10 to be adapted for use in a variety of circumstances, where the disposition or arrangement of plant material to be pre-pruned may vary.

Figure 6:
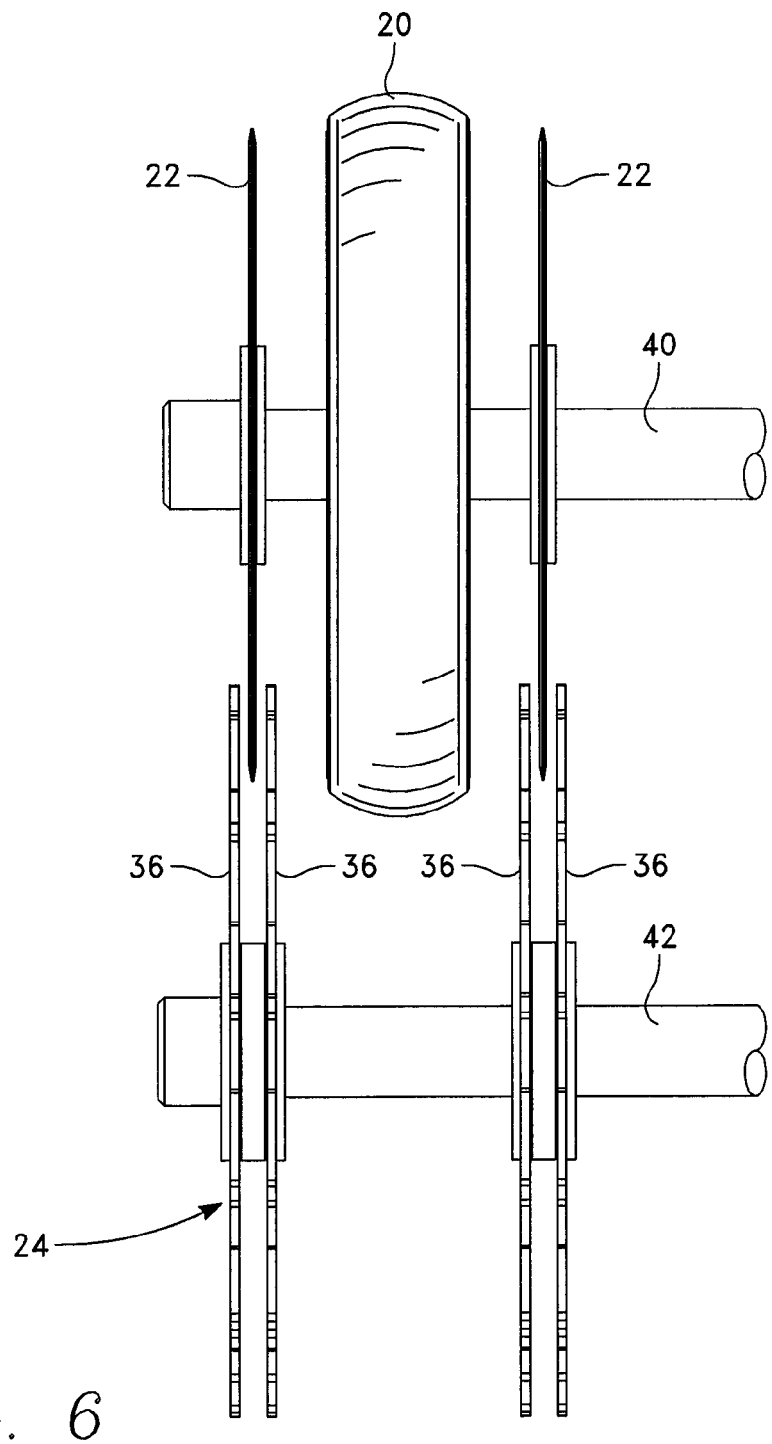
FIG. 6 is a front elevation view of one embodiment of a pruning head of the present invention, showing the spatial relationship between a cutting disk and anvil assembly when the pruning head is substantially closed.

As noted above, when in use, pruning device 10 is preferably attached to a tractor or other vehicle for moving pruning device 10 along a row of plants to be pre-pruned. Cutting disks 22 preferably rotate at ground speed, aligned with corresponding anvil assemblies 24 on anvil shaft 44. The canes or other plant growth desired to be removed from the plants being pruned are removed in a two-fold manner. The shape and disposition of anvils 36 in each anvil assembly 24 forces canes into the gap between anvils 36, where the concentrated shear forces on the canes cause the canes to break. The alignment of a plurality of cutting disks 22 on cutter shaft 40, and the corresponding anvil assemblies 24 on anvil shaft 42, results in canes being broken or severed into multiple sections. Because cutting disks 22 are rotating at close to ground speed, the velocity of cutting disks 22 is low, allowing the cut and broken canes and other plant material to fall to the ground. Pruning devices that incorporate high-speed rotating blades often propel plant material at high speed in random directions. FIG. 6 provides an elevation view of cutting disk 22 and anvil assembly 24 when pruning head 26 is substantially closed.

Opening wheels 20 serve to protect trellis cross-arms from the pruning action of pruning device 10. Opening wheels 20 are slightly larger in diameter than cutting disks 22, and may comprise wheels, tires, or other suitable structures. The presence of one or more opening wheels 20 on cutter shaft 40 creates a space between cutting disks 22 and the trellis cross-arm, thereby allowing cutting disks 22 to pass over the cross-arm without doing damage to the cross-arm or to pruning device 10. Trellis wires pass alongside cutting disks 22 and anvils 36 without being damaged.

The adjustable action of the present device is preferably provided by via hydraulics. Hydraulic fluid flow and pressure is adjustable so the operator of the present device can open and close pruning head 26 when entering a row of plants to be pruned. This action is controlled by hydraulic actuators 48 and 50. The operator can also vary the pinch force intensity required to keep cutting disks 22 inside the gaps between associated anvils 36 as the canes pass through. The pressure on various hydraulic actuators 48 and 50 can be adjusted to allow proper cutting of canes or other plant material without damaging the trellis cross-arms.

Opening and closing of pruning head 26 occurs, for example, at the beginning and end of a row of grapes or other plants to be pruned. As trellis wires reach the end of the row, they begin to move inward toward the trellis end post rather than running parallel to the row. Pruning head 26 should be disengaged from the trellis system before the angle of the wires changes such that they are no longer parallel to the row. This prevents the cutting disks 22 of the device from cutting the trellis wires. Further, it is contemplated that pruning head 26 may need to be opened at other times along the length of a row, such as when a broken or misshapen trellis cross-arm is encountered, or another object is encountered (such as, for example, a weather station transmitter).

Figure 14:
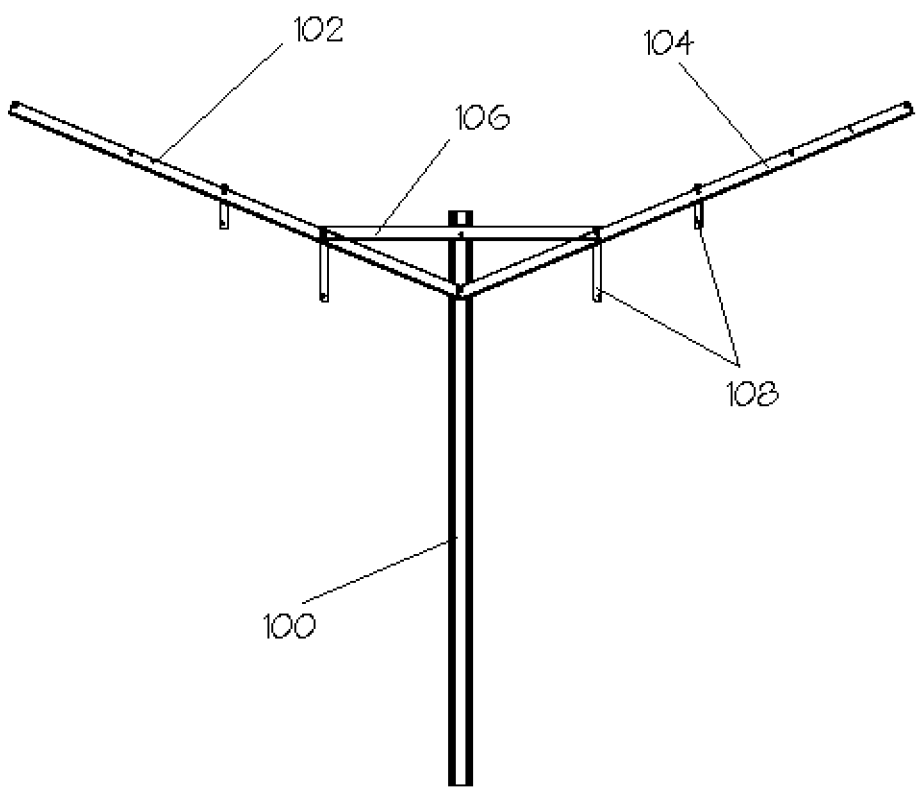
FIG. 14 depicts an exemplary embodiment of an open gable trellis capable of use in conjunction with the present invention.

In addition to allowing an operator of the present invention to open and close pruning head 26, the operator of the present device can vary the amount of force exerted by hydraulic cylinders 48 and 50 and, thus, the force exerted by the various components of the present device mounted on anvil shaft 42 and cutter shaft 40. The present device incorporates a sensor (not shown) that is adapted to sense the amount of force exerted by hydraulic cylinders 48 and 50, and can cause that force to be reduced when it exceeds a predetermined value. This allows the opening wheels 20 to force pruning head 26 open around a cross-arm or other obstruction. The force required to open pruning head 26 is greater than the force required to cut the canes, and thus the present device cuts canes when encountered but pruning head 26 automatically opens when a cross-arm or other obstruction is encountered (an exemplary open gable trellis with cross-arms is depicted in FIG. 14 and described below). As pruning head 26 opens, anvils 36 serve to push the cross-arm in the direction of travel of anvils 36, thereby allowing the present device to pass without harming either the cross-arms or the present device. In an exemplary embodiment of the present invention, the predetermined amount to which the valve or sensor is set may be 800 psi. The sensor may, for example, be in fluid communication with both the anvil shaft and the cutter shaft, causing a total of 800 psi to be exerted by the combined effect of both shafts. When canes impact the anvils or opening wheel, the force exerted against the device is insufficient to overcome this 800 psi threshold. The canes are directed to the cutting disk where they are cut or broken. When a cross-arm impacts the anvils or opening wheel, however, the force exerted against the device is greater than 800 psi. The valve or sensor recognizes this fact and allows the pruning head to open.

Figure 8:
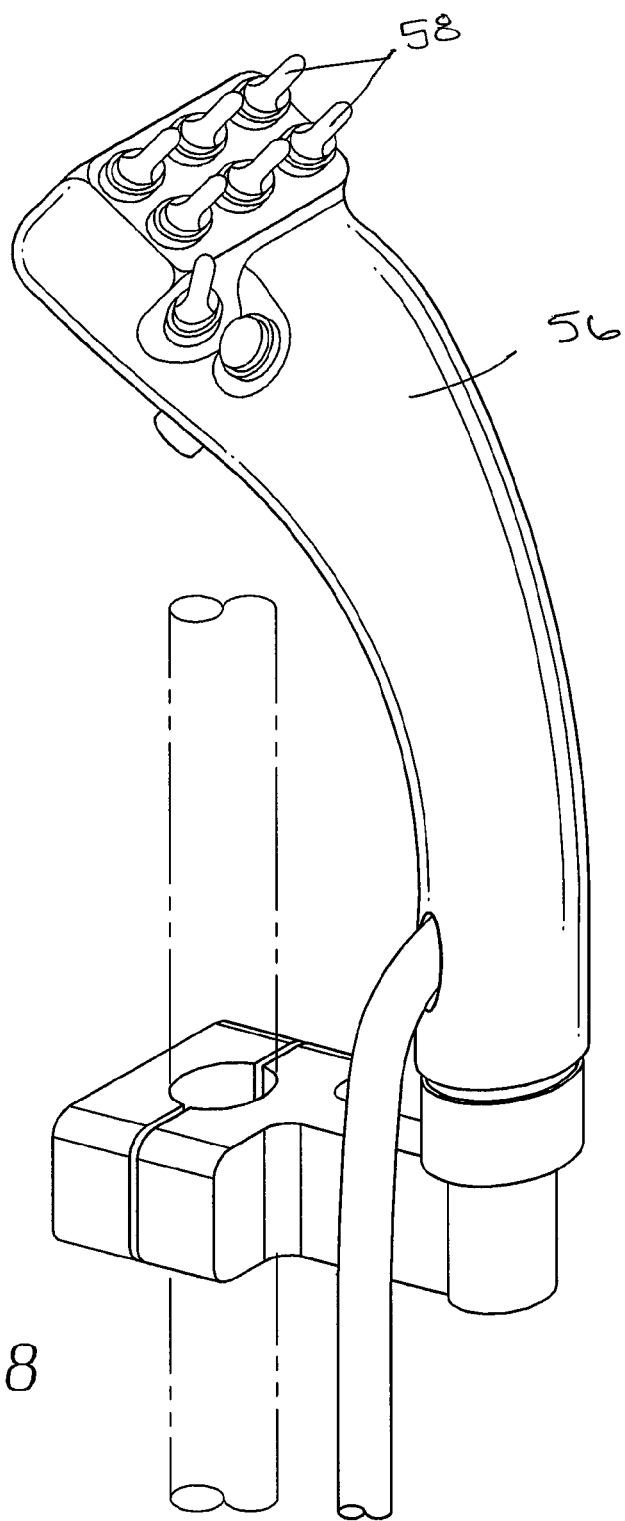
FIG. 8 is a perspective view of one embodiment of a controller adapted for use with the present invention.

Control of the hydraulics of the present device is preferably provided via a pistol grip handle on the tractor or other vehicle used to move pruning device 10 along a row of plants. An exemplary embodiment of such a controller is shown in FIG. 8. Controller 56 includes a plurality of switches 58 providing a range of functionality. Controls available to the operator preferably include, but are not limited to, on and off forward rotation of cutting disks 22, reverse rotation of cutting disks 22, movement of pruning head 26 up and down by adjusting the height of vertical arm 12, and opening and closing of pruning head 26 by adjusting the positions of cutter shaft 40 and anvil shaft 42 relative to one another.

Figure 9:
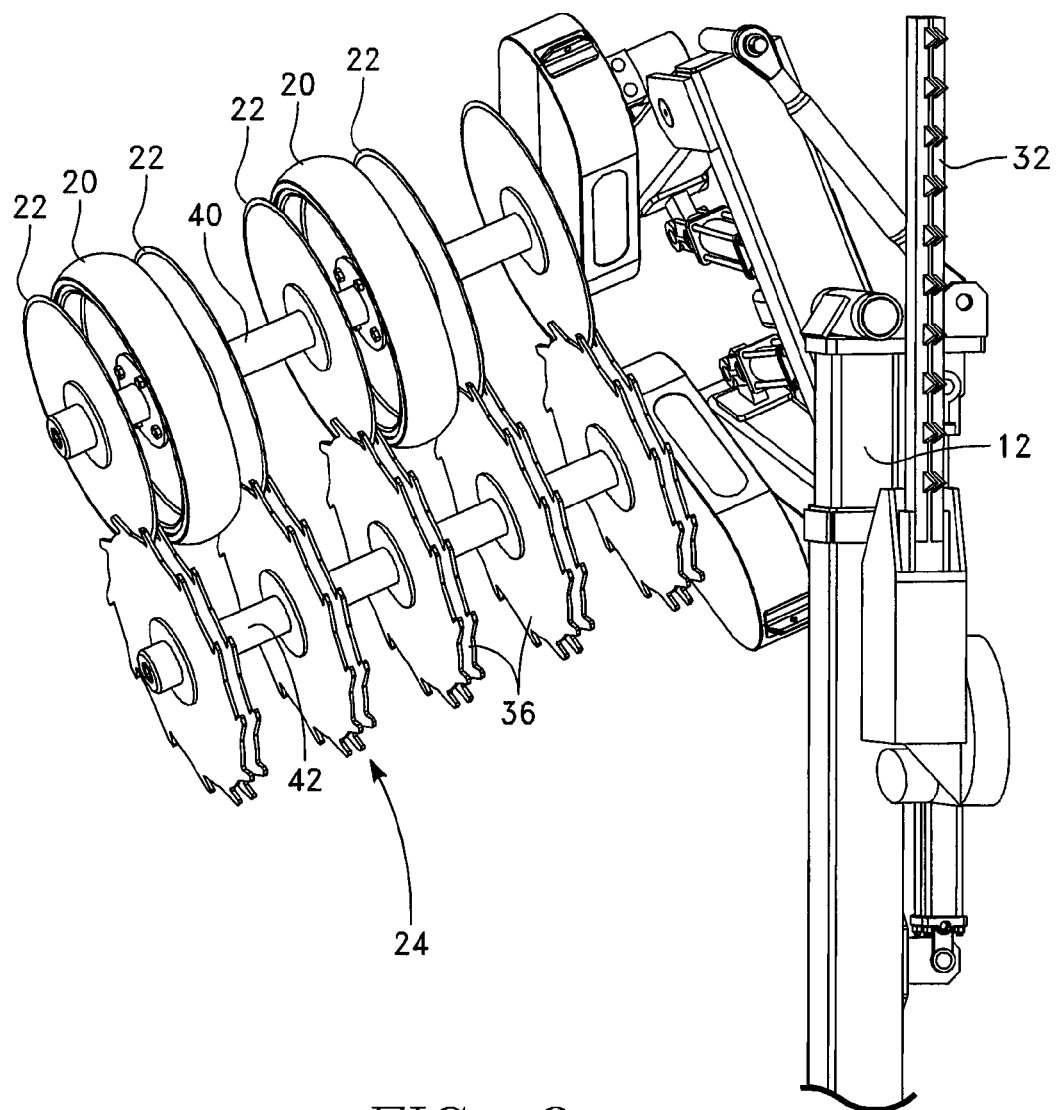
FIG. 9 is a front perspective view of one embodiment of a pruning device of the present invention, the embodiment including a reciprocating blade associated therewith.

FIG. 9 is a perspective view of one embodiment of a pruning device 10 of the present invention having a reciprocating blade 32 associated therewith. Reciprocating blade 32 is attached to the front of pruning device 10 and is adjustable in height. Reciprocating blade 32 allows for cutting and/or removal of material extending across a plant row so that the material does not obstruct the passage of pruning device 10 along the plant row.

Figure 10:
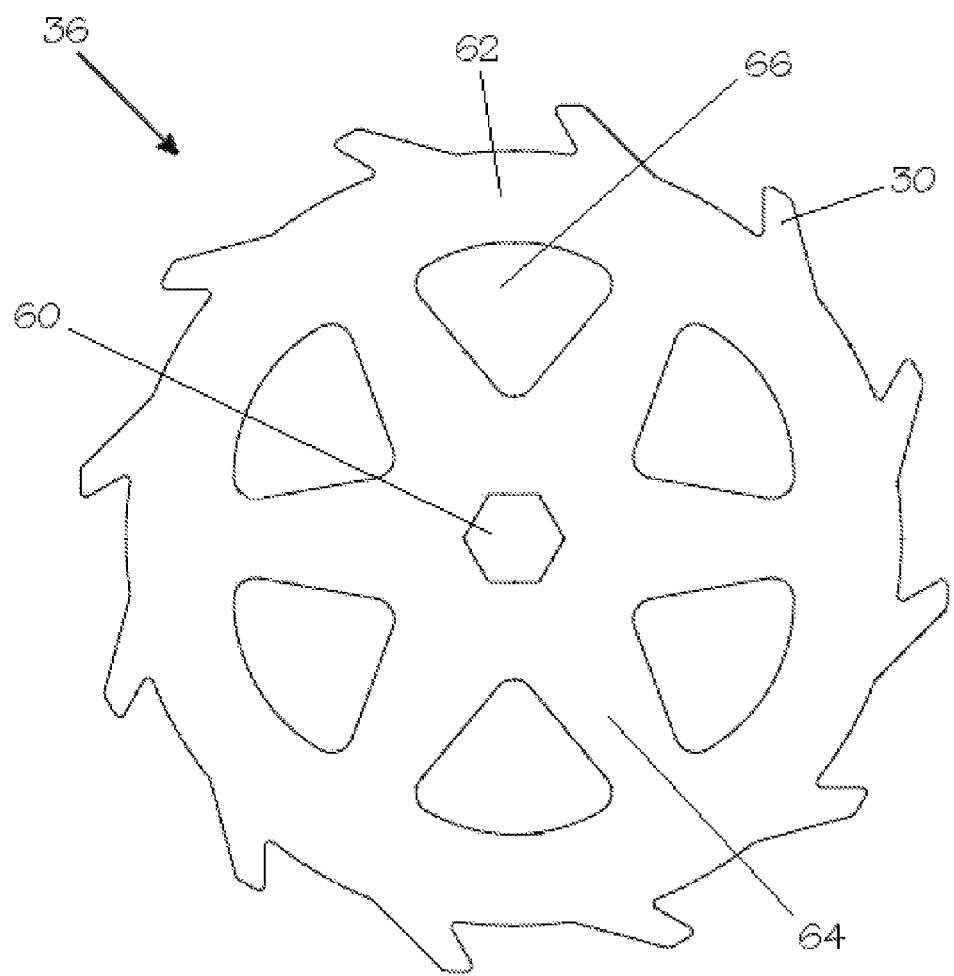
FIG. 10 is an elevation view of one embodiment of an anvil of the present invention.
Figure 11:
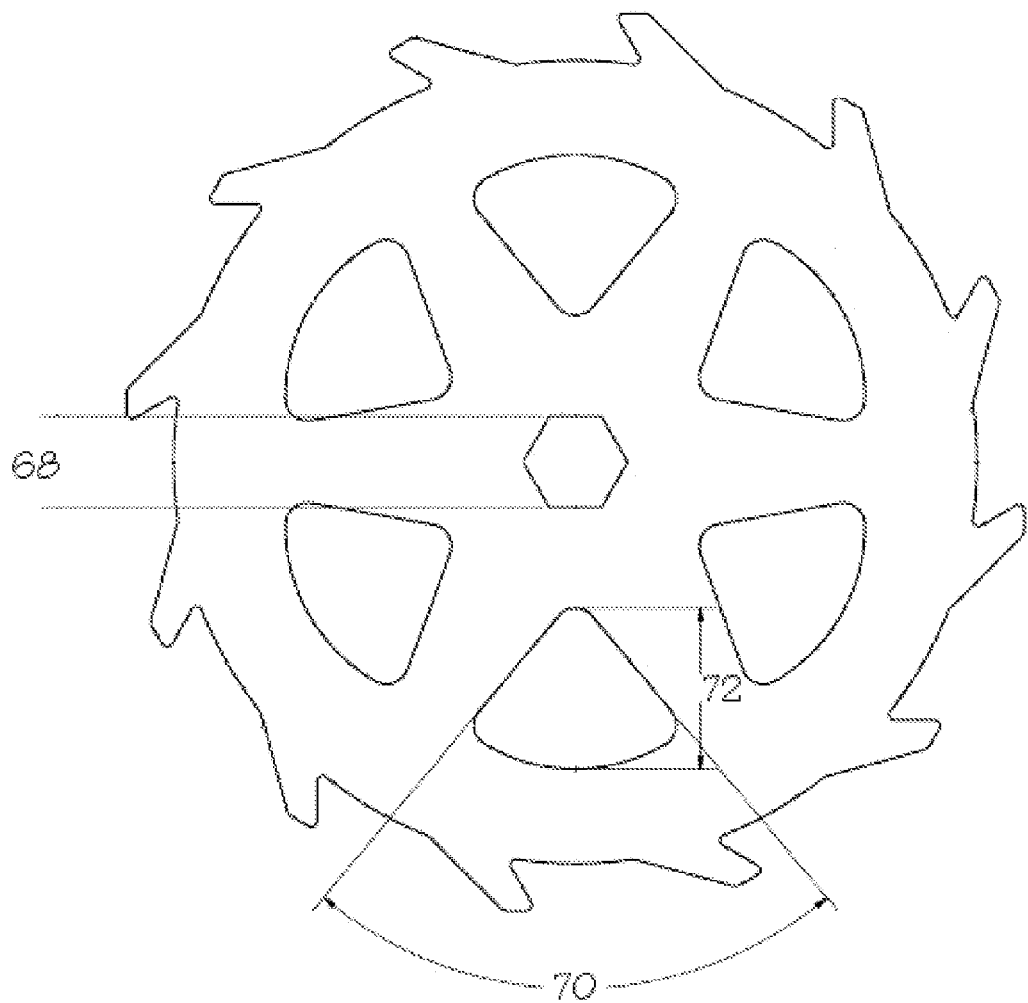
FIG. 11 is an elevation view of the anvil of FIG. 10 showing certain dimensions thereof.
Figure 12:
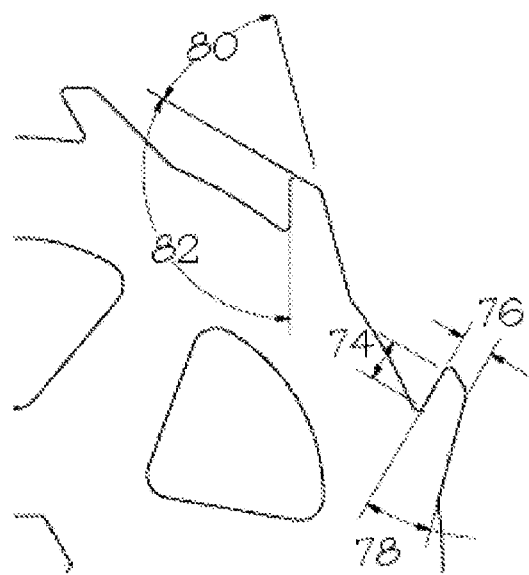
FIG. 12 is a view of one quadrant of the anvil of FIG. 10 showing certain dimensions thereof.

FIG. 10 depicts one embodiment of an anvil 36 constructed in accordance with the teachings of the present invention. It is to be understood that the embodiment of anvil 36 shown in FIGS. 10, 11, and 12 is an exemplary embodiment provided to clarify the teachings of the present invention, and that one of skill in the art will ascertain various modifications to this embodiment of anvil 36 upon reading this disclosure. In the embodiment shown, anvil 36 includes generally an axial hole 60, through which a shaft or other structure can be inserted, a circular rim 62, a plurality of serrations 30, a plurality of ribs 64, and a plurality of void spaces 66, the void spaces 66 defined between two adjacent ribs 64 and circular rim 62.

FIG. 11 provides exemplary dimensions of certain aspects of the anvil 36 shown in FIG. 10. For example, axial hole 60 is shown as a hexagonal opening in anvil 36, the diameter between any two opposing edges of the hexagonal opening being represented by element number 68. In a preferred embodiment of the present invention, this distance, 68, is 2.03 inches. In the exemplary embodiment of anvil 36 shown in FIG. 11, angle 70 is 79.6°, and the distance from the innermost point of a void space 66 to the outermost point of a void space 66 is 3.596 inches.

Figures 13A, 13B:
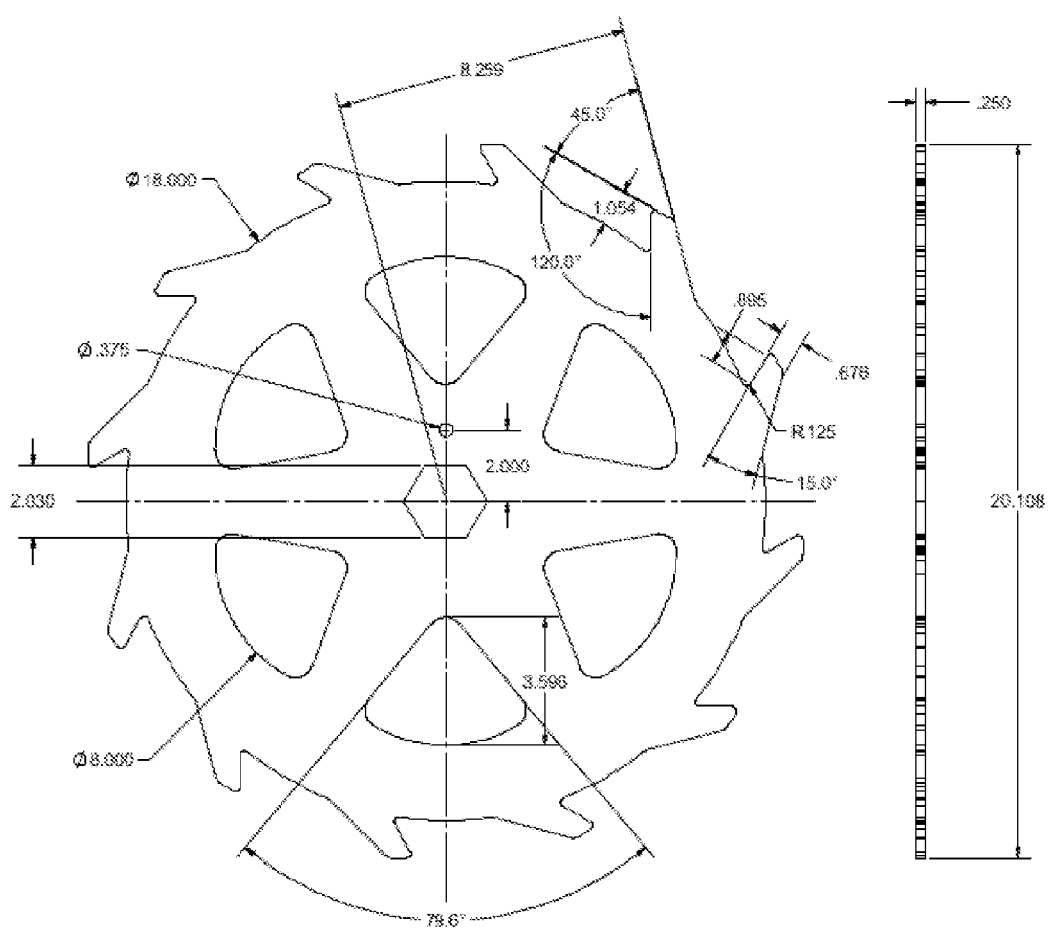
FIG. 13a depicts one exemplary embodiment of an anvil of the present invention, with dimensions indicated thereon.
FIG. 13b depicts the embodiment of the anvil shown in FIG. 13a, as seen from the side.

Turning to FIG. 12, one quadrant of the anvil 36 of FIGS. 10 and 11 is depicted, the drawing providing further information relating to exemplary dimensions of anvil 36. Element 74 represents the length of the forward edge (as determined by the direction of rotation of the anvil) of an individual serration 30. The value of length 74 is 0.895 inches. The length 76 of the outward edge of a serration 30 is 0.676 inches. The angle 78 between the forward and rearward edges of a serration 30 is fifteen degrees. The angle 80 between the rearward edge of a serration 30 and the outward edge of the serration 30 is forty-five degrees. Finally, the angle 82 between the outward edge of a serration 30 and the forward edge of the serration 30 is one-hundred twenty degrees. The thickness of the exemplary anvil 36 shown is 0.25 inches. FIG. 13 depicts one exemplary embodiment of an anvil 36 of the present invention, with the various dimensions of this embodiment of anvil 36 provided in the Figure. FIG. 13a provides an elevation view of one side of anvil 36, while FIG. 13b provides a side view of the same embodiment of anvil 36.

The dimensions provided above allow for the desired functionality of anvils 36 of the present invention, though as noted the dimensions provided are exemplary and it is contemplated that other dimensions may be used without departing from the spirit or scope of the present invention. Anvils 36 of the present invention serve two purposes. First, anvils 36 grab canes or other plant material from the plant growth being pruned and push the material through cutting disks 22. Anvils 36 also engage the cross-arms of the trellis construction along a row of grapes or other plants, holding the cross-arm against the press wheel of the device. This overcomes the hydraulic set pressure and opens the pruning head, allowing the cross-arm to pass unharmed. The height of a serration 30 must be sufficient to grab and hold the cross-arm. Further, the shape of a serration 30 must allow an anvil 36 to push the cross-arm without becoming hooked into it.

FIG. 14 depicts an embodiment of an open gable trellis, commonly used with respect to table grape production. The trellis includes a trellis post 100, cross-arms 102 and 104, and a structural support 106 affixed to the two cross-arms as well as to the trellis posts. Trellis wires (not shown) are typically affixed to wire supports 108, though the wires may also be affixed directly to the cross-arms. An open gable trellis such as that shown in the drawings may be constructed from 30 mm L-Rail steel, with the various components of the trellis bolted to each other and to trellis post 100 in four locations, using galvanized steel bolts. Cross-arms 102 and 104 are typically bolted to trellis post 100 where they meet, and structural support 106 is typically bolted to trellis post 100 where the two intersect. The opposing ends of structural support 106 are bolted to the respective cross-arms where the ends of structural support 106 meet the cross-arms along their lengths. Although steel is often used, other materials, such as treated wood, may also be used. As can be seen in the Figure, the cross-arms extend from trellis post 100 at an angle thereto, and this angle coincides with the angle at which pruning head 26 of the present device is disposed. The precise angle of the trellis cross-arms may vary from field to field, or even among rows within a field, and the angle of pruning head 26 can be adjusted accordingly. As described above, pruning head 26 opens when encountering the trellis cross-arms, allowing the present pruning device to pass the trellis cross-arms without damaging them or the pruning device.

The foregoing description of the present invention is illustrative of one embodiment of the present device. Various modifications and alternative embodiments to that described above will be readily apparent to one of ordinary skill in the art upon reading this disclosure. For example, although the embodiments of pruning device 10 shown and described above are associated with a separate vehicle for movement of pruning device 10 along a plant row, it is contemplated that a vehicle may be constructed having the features of the present invention constructed as an integral part thereof. It is contemplated that all such modifications and alternative embodiments fall within the spirit and scope of the present invention.

Having thus described the preferred embodiment of the invention, what is claimed as new and desired to be protected by Letters Patent includes the following:

The invention claimed is:

1. A device for pruning plant growth, the device comprising:
   a frame;
   a vertical arm extending from said frame;

a pruning head extending from said vertical arm the pruning head comprising:
  first rotatable shaft;
  at least one cutting disk attached to said first rotatable shaft;
  an opening wheel attached to the first rotatable shaft adjacent said at least one cutting disk, the opening wheel having a diameter greater than the diameter of the at least one cutting disk such that said opening wheel contacts an obstacle encountered by said pruning head prior to said cutting disk;
  a second rotatable shaft disposed substantially parallel to said first rotatable shaft; and
  at least one anvil assembly comprising at least one anvil pair, the anvil pair comprising a first anvil attached to the second rotatable shaft and a second anvil attached to the second rotatable shaft, the first anvil and second anvil defining a space therebetween; and
an adjustable coupling having a first end and a second end, the first end of the adjustable coupling attached to the vertical arm and the second end of the adjustable coupling attached to the pruning head, such that a horizontal disposition of the pruning head is selectively positionable between a first angle and a second angle with respect to the vertical arm,
and further wherein the at least one cutting disk is aligned on the first rotatable shaft to extend into the space defined by the at least one anvil pair on the second rotatable shaft.

2. The device according to claim 1, wherein the vertical arm extending from said frame comprises a hydraulic cylinder for raising and lowering the height of said vertical arm.

3. The device according to claim 1, wherein each of the two anvils of said anvil pair comprises a serrated edge.

4. The device according to claim 1, wherein said frame comprises at least one wheel mounted on a lower portion thereof, said at least one wheel contacting the ground when the device is in use and allowing the device to move thereover.

5. The device according to claim 1, wherein the horizontal disposition of said pruning head is selectively positionable between from about forty-five degrees relative to the vertical arm to about ninety degrees relative to the vertical arm.

6. The device according to claim 1, wherein the pruning head further comprises:
  a structural arm attached to said vertical arm, the structural arm having a first end and an opposing second end;
  a first support arm attached to the first end of the structural arm and extending away therefrom;
  a second support arm attached to the second end of the structural arm and extending away therefrom; and
  a second adjustable coupling engaging the first support arm and the second support arm,
  wherein the first shaft extends from the first support arm and the second shaft extends from the second support arm, the angle between the first shaft and the second shaft adjustable via the second adjustable coupling.

7. The device according to claim 1, wherein the relative angle between the first and second shafts is adjustable.

8. The device according to claim 1 wherein each of the two anvils of said anvil pair comprise a plurality of serrations along an outer edge thereof, the serrations sized and shaped to engage plant growth to be pruned and to direct said plant growth to said cutting disk.

9. The device according to claim 8 further wherein the serrations are sized and shaped to engage a trellis cross-arm such that the cross-arm is pushed in the direction of travel of said anvils, allowing said device to safely pass the trellis cross-arm.

10. The device according to claim 8 wherein each of the two anvils of said anvil pair comprises a circular rim and further defines an axial hole through a center thereof, and further wherein said serrations comprise:
  a rearward edge extending outwardly from said circular rim;
  an outward edge extending from said rearward edge; and
  a forward edge extending from said outward edge to said circular rim.

11. A device for pruning plant growth, the device comprising:
  a frame;
  a vertical arm extending from said frame;
  a pruning head extending from said vertical arm the pruning head comprising:
    first rotatable shaft;
    at least one cutting disk attached to said first rotatable shaft;
    an opening wheel attached to the first rotatable shaft adjacent said at least one cutting disk, the opening wheel having a diameter greater than the diameter of the at least one cutting disk such that said opening wheel contacts an obstacle encountered by said pruning head prior to said cutting disk;
    a second rotatable shaft disposed substantially parallel to said first rotatable shaft; and
    at least one anvil assembly comprising at least one anvil pair, the anvil pair comprising a first anvil attached to the second rotatable shaft and a second anvil attached to the second rotatable shaft, the first anvil and second anvil defining a space therebetween, wherein each of the two anvils of said anvil pair comprise a plurality of serrations along an outer edge thereof, the serrations sized and shaped to engage plant growth to be pruned and to direct said plant growth to said cutting disk; and
  an adjustable coupling having a first end and a second end, the first end of the adjustable coupling attached to the vertical arm and the second end of the adjustable coupling attached to the pruning head, such that a horizontal disposition of the pruning head is selectively positionable between a first angle and a second angle with respect to the vertical arm,
  wherein each of the two anvils of said anvil pair comprises a circular rim and further defines an axial hole through a center thereof, and further wherein said serrations comprise:
    a rearward edge extending outwardly from said circular rim;
    an outward edge extending from said rearward edge; and
    a forward edge extending from said outward edge to said circular rim,
    and further wherein a line drawn along said outward edge is at about forty-five degrees to a line drawn along said rearward edge, and further wherein a line drawn along said forward edge is at about one-hundred twenty degrees to a line drawn along said outward edge.

12. The device according to claim 11 wherein a line drawn along said rearward edge is at about fifteen degrees to a line drawn along said forward edge.

13. The device according to claim 12 wherein the length of said forward edge is about 1.32 times the length of said outward edge.

14. The device according to claim 12 wherein said outward edge has a length of about 0.676 inches, and said forward edge has a length of about 0.895 inches.

* * * * *